United States Patent
Katayama

(10) Patent No.: US 11,104,217 B2
(45) Date of Patent: Aug. 31, 2021

(54) IN-WHEEL MOTOR VEHICLE

(71) Applicant: TOYOTA JIDOSHA KABUSHIKI KAISHA, Toyota (JP)

(72) Inventor: Masaaki Katayama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/550,453

(22) Filed: Aug. 26, 2019

(65) Prior Publication Data

US 2020/0130497 A1    Apr. 30, 2020

(30) Foreign Application Priority Data

Oct. 25, 2018 (JP) .............................. JP2018-201101

(51) Int. Cl.
| | |
|---|---|
| *B60K 1/00* | (2006.01) |
| *B60K 7/00* | (2006.01) |
| *H02K 5/22* | (2006.01) |
| *H02K 7/18* | (2006.01) |

(52) U.S. Cl.
CPC ........... *B60K 7/0007* (2013.01); *H02K 5/225* (2013.01); *H02K 7/1846* (2013.01)

(58) Field of Classification Search
CPC .......... B60K 7/0007; B60K 7/00; B60K 1/00; B60K 1/02; B60K 1/04; B60K 2001/003; B60K 2001/006; B60K 2001/0438; B60L 50/60; B60L 50/00; B60L 50/50; B60L 2220/42; B60L 2220/44; B60L 2220/46; H02K 5/225; H02K 5/00; H02K 5/04; H02K 5/20; H02K 5/22; H02K 7/1846
See application file for complete search history.

(56) References Cited

U.S. PATENT DOCUMENTS

| | | | | |
|---|---|---|---|---|
| 3,792,742 A * | 2/1974 | Mager | ..................... | B60L 50/52 180/65.51 |
| 4,913,258 A * | 4/1990 | Sakurai | ................. | B60K 17/30 180/242 |
| 7,468,562 B1 * | 12/2008 | Barbic | .................. | B60K 11/08 290/40 C |
| 8,727,051 B2 * | 5/2014 | Schmid | .................... | B60K 6/30 180/65.31 |
| 8,757,304 B2 * | 6/2014 | Amano | ................ | B60L 3/0069 180/65.1 |
| 8,800,699 B2 * | 8/2014 | Chodura | ............... | B60K 17/12 180/65.22 |

(Continued)

FOREIGN PATENT DOCUMENTS

JP      2010-264823 A     11/2010

*Primary Examiner* — James M Dolak

(74) *Attorney, Agent, or Firm* — Sughrue Mion, PLLC

(57) ABSTRACT

The vehicle includes a pair of power control units (PCUs) provided corresponding to each of a pair of in-wheel motors. The pair of PCUs include two PCUs having a common structure. The PCU includes a cuboid housing, an MG terminal provided on a first side surface of the cuboid housing, and a battery terminal provided on a second side surface orthogonal to the first side surface. Each of the pair of power control units is arranged such that each of the MG terminals faces a vehicle width direction in which a corresponding in-wheel motor is located and each of the battery terminals faces a same direction in a vehicle front-rear direction.

5 Claims, 9 Drawing Sheets

(56) References Cited

U.S. PATENT DOCUMENTS

| | | | | |
|---|---|---|---|---|
| 9,035,487 | B2 * | 5/2015 | Tomokage | B60L 53/14 |
| | | | | 307/9.1 |
| 9,487,092 | B2 * | 11/2016 | Yamada | B60L 15/08 |
| 9,561,762 | B2 * | 2/2017 | Miyashita | B60L 3/003 |
| 9,712,090 | B2 * | 7/2017 | Yamada | H02P 6/04 |
| 9,937,779 | B2 * | 4/2018 | Koike | B60K 7/0007 |
| 10,396,631 | B2 * | 8/2019 | Herb | H02K 5/20 |
| 10,581,295 | B2 * | 3/2020 | Albi | B60K 7/0007 |
| 10,857,889 | B2 * | 12/2020 | Liu | B60L 58/10 |
| 10,870,356 | B2 * | 12/2020 | Yokoyama | B60L 9/18 |
| 10,882,390 | B2 * | 1/2021 | Iwamitsu | B60W 10/06 |
| 10,919,375 | B2 * | 2/2021 | Blanc | B60K 1/00 |
| 10,938,278 | B2 * | 3/2021 | Tominaga | B60K 17/354 |
| 10,988,033 | B2 * | 4/2021 | Monkhouse | B60W 30/02 |
| 2010/0025131 | A1 * | 2/2010 | Gloceri | B62D 21/11 |
| | | | | 180/65.28 |
| 2013/0176761 | A1 * | 7/2013 | Hattori | B60L 50/16 |
| | | | | 363/131 |

* cited by examiner

IN-WHEEL MOTOR VEHICLE

CROSS-REFERENCE TO RELATED APPLICATION

The present disclosure claims priority under 35 U.S.C. § 119 to Japanese Patent Application No. 2018-201101, filed on Oct. 25, 2018. The contents of the application are incorporated herein by reference in their entirety.

FIELD

The present disclosure relates to an in-wheel motor vehicle equipped with an in-wheel motor.

BACKGROUND

In-wheel motor vehicles are known which run with an in-wheel motor disposed within the wheel as a drive source. Japanese Patent Laid-Open No. 2010-264823 discloses a technique relating to an electric vehicle provided with such an in-wheel motor. The electric vehicle of this technology includes an in-wheel motor for independently driving each wheel. Each in-wheel motor is provided with an inverter. That is, in the electric vehicle of Japanese Patent Laid-Open No. 2010-264823, an in-wheel motor and an inverter are provided for each of the four wheels. The electric vehicle of this technology includes a battery for supplying DC power to each inverter.

SUMMARY

The power of the battery supplied to the in-wheel motor is controlled by a power control unit (PCU) including of electrical components such as an inverter. In a configuration in which independent power control units are provided for the in-wheel motors of the wheels, the number of power control units corresponding to the number of in-wheel motors is required. Since the positional relationship between the battery and the in-wheel motor differs for each power control unit, a dedicated design is required for optimization.

In the above-mentioned conventional technique, the number of inverters as PCU is distributed to the in-wheel motors, but the structure and arrangement thereof are not optimized. For this reason, in the above-mentioned conventional technique, there is a problem in that the structure of the plurality of power control units is simplified and the cables to be connected are routed.

It is an object of the present disclosure to provide an in-wheel motor vehicle capable of optimizing the structure and arrangement of each power control unit in a vehicle in which a plurality of in-wheel motors are controlled by different power control units.

A first aspect of the present disclosure is applied to an in-wheel motor vehicle in order to achieve the above purpose. The in-wheel motor vehicle includes a pair of in-wheel motors provided corresponding to each of a pair of wheels, a battery for storing electric power for driving the pair of in-wheel motors, and a pair of power control units provided corresponding to each of the pair of in-wheel motors. The pair of power control units include two power control units having a common structure, The power control unit includes a cuboid housing, an MG terminal provided on a first side surface of the cuboid housing, for connecting an MG cable connected to the in-wheel motor, and a battery terminal provided on a second side surface orthogonal to the first side surface, for connecting a battery cable connected to the battery. Each of the pair of power control units is arranged such that each of the MG terminals faces a vehicle width direction in which a corresponding in-wheel motor is located and each of the battery terminals faces a same direction in a vehicle front-rear direction.

A second aspect of the present disclosure has the following further features in the first aspect.

The pair of power control units are arranged so that opposite side surfaces are in contact with each other.

A third aspect of the present disclosure further has the following features in the first aspect.

The power control unit includes a cooler provided inside, and a connection port provided on a side surface opposite to the second side surface, for connecting between the cooler and an external pipe.

A fourth aspect of the present disclosure has the following features in the first aspect.

Each of the pair of power control units is arranged such that each of the battery terminals face in a direction in which the battery is arranged.

A fifth aspect of the present disclose further has the following features in the first aspect.

The vehicle includes two sets of the pair of in-wheel motors, and two sets of the pair of power control units.

A sixth aspect of the present disclose is applied to an in-wheel motor vehicle in order to achieve the above purpose.

The in-wheel motor vehicle includes a pair of in-wheel motors provided corresponding to each of a pair of wheels, a battery for storing electric power for driving the pair of in-wheel motors; and a pair of power control units provided corresponding to each of the pair of in-wheel motors. The pair of power control units including two power control units having a common structure. The power control unit includes a cuboid housing, an MG terminal provided on a first side surface of the cuboid housing, for connecting an MG cable connected to the in-wheel motor, and a battery terminal provided on an upper surface orthogonal to the first side surface, for connecting a battery cable connected to the battery. The battery terminal is configured to connect the MG cable in arbitrary direction along the upper surface. Each of the pair of power control units is arranged such that each of the battery terminals faces a same direction in a vertical direction and each of the MG terminals faces a vehicle width direction in which a corresponding in-wheel motor is located.

A seventh aspect of the present disclose has the following features in the sixth aspect.

The pair of power control units are arranged so that opposite side surfaces are in contact with each other.

An eighth aspect of the present disclose has the following features in the sixth aspect.

The power control unit includes a cooler provided inside, and a connection port provided on a bottom surface opposite to the upper side surface, for connecting between the cooler and an external pipe. The connection port is configured to connect the external pipe in arbitrary direction along the bottom surface.

According to the first aspect, the two power control units having a common structure are arranged such that the respective MG terminals faces the side of the corresponding in-wheel motor and the respective battery terminals faces the same direction. According to such an arrangement, it is possible to prevent complication of cable routing while making the structures of the respective power control units common.

According to the second aspect, the two power control units having the common structure are arranged so that the opposing surfaces are in contact with each other. This makes it possible to make the power control unit compact.

According to the third aspect, the two power control units are arranged such that the respective connection ports of the cooler are provided in the same direction. As a result, it is possible to prevent the external piping connected to the connection port of the cooler from becoming complicated.

According to the fourth aspect, the battery terminal is provided at a position facing the side on which the battery is arranged. This makes it possible to prevent the battery cable from becoming complicated to be routed.

According to the fifth aspect, even in a vehicle having an in-wheel motor on four wheels, it is possible to prevent the MG cable and the battery cable from becoming complicated to be routed.

According to the sixth aspect, the battery terminal provided on the upper surface of the power control unit is configured to be connectable in an arbitrary direction along the upper surface. According to such a configuration, the battery cables of the pair of power control units can be connected from the same direction.

According to the seventh aspect, the two power control units of the same shape are arranged such that opposite surfaces are in contact. This makes it possible to make the power control unit compact.

According to the eighth aspect, the connection port of the cooling pipe provided on the lower surface of the power control unit is configured to be connectable in arbitrary direction along the lower surface. According to such a configuration, the external pipes of the pair of power control units can be connected from the same direction.

DESCRIPTION OF EMBODIMENT

Embodiments of the present disclosure will be described below with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, the structures, steps and the like that are described in the embodiments shown as follows are not always indispensable to the disclosure unless specially explicitly shown otherwise, or unless the disclosure is explicitly specified by the structures, steps and the like theoretically.

FIRST EMBODIMENT 1-1. CONFIGURATION OF IN-WHEEL MOTOR VEHICLE OF FIRST EMBODIMENT

Figure 1:
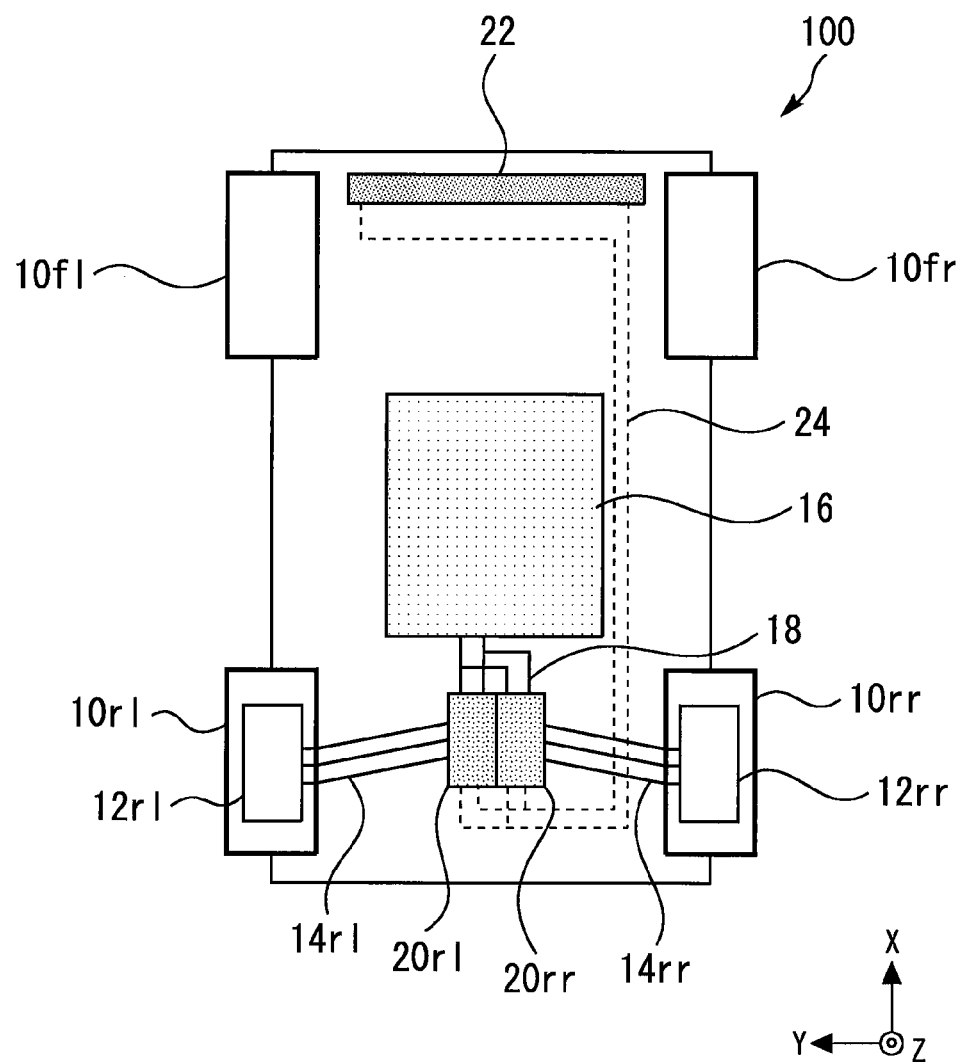
FIG. 1 is a diagram showing a configuration of an in-wheel motor vehicle according to Embodiment 1.

Hereinafter, First Embodiment will be described with reference to the drawings. FIG. 1 is a diagram showing a configuration of an in-wheel motor vehicle according to First Embodiment. In the following description, the traveling direction (longitudinal direction) of the vehicle 100 is defined as the X direction, the vehicle width direction (lateral direction) of the vehicle 100 is defined as the Y direction, and the height direction (vertical direction) of the vehicle 100 is defined as the Z direction. The symbol in the Z direction is defined as "positive" in the upward direction.

The in-wheel motor vehicle 100 according to the first embodiment includes four wheels 10. In the four wheels 10, the front wheels and the rear wheels are arranged apart from each other in the X direction, and the left wheels and the right wheels are arranged apart from each other on the same axle extending in the Y direction. In the following description, when distinguishing the wheels 10 in particular, the right front wheel, the left front wheel, the right rear wheel, and the left rear wheel are denoted as wheels 10*fr*, 10*fl*, 10*rr*, and 10*rl*, respectively.

Inside the pair of wheels 10*rr* and 10*rl*, in-wheel motors 12 for independently driving the corresponding wheels are disposed. In the following description, when the in-wheel motors 12 provided for the wheels 10*rr* and 10*rl* are particularly distinguished, it will be referred to as in-wheel motors 12*rr* and 12*rl*, respectively.

The pair of in-wheel motors 12*rr* and 12*rl* are configured as brushless motors, for example. The rotation torques of the in-wheel motors 12*rr* and 12*rl* are transmitted to the corresponding wheels 10*rr* and 10*rl*, respectively. In the vehicle 100 according to the first embodiment, the braking and driving forces generated in the wheels 10*rr* and 10*rl* can be independently controlled by independently controlling the rotational torques of the in-wheel motors 12*rr* and 12*rl*.

The pair of in-wheel motors 12*rr* and 12*rl* are connected to a corresponding power control unit 20 via an MG cable 14. Hereinafter, the power control unit 20 is simply referred to as "PCU" 20. In the following explanation, when the MG cable 14 and the PCU 20 connected to the pair of in-wheel motors 12*rr* and 12*rl* are particularly distinguished from each other, they are denoted as MG cables 14*rr* and 14*rl* and PCUs 20*rr* and 20*rl*, respectively. The pair of PCUs 20 include two PCUs 20*rr* and 20*rl* having the same structures. The configuration and layout of the respective PCU 20 will be described in detail later. The MG cable 14 is configured as a three-phase cable for passing a three-phase alternating current, for example.

A battery 16 is disposed at the central of the vehicle 100. The battery 16 is connected to the PCU 20 via battery cables 18. The PCU 20 boosts DC power supplied from the battery 16 and converts the DC power into AC power. The PCU 20 supplies the converted AC power to the in-wheel motor 12. As a result, the in-wheel motor 12 generates driving torque by power running control, and directly generates driving force to the wheels 10rr and 10rl.

A radiator 22 is disposed in front of the vehicle 100. As will be described in detail later, the PCU 20 includes a cooler for cooling heat generated by supplying power. The radiator 22 is connected to the cooler of the PCU 20 via an external pipe 24. The PCU 20 is cooled by exchanging heat between the radiator and the cooler by circulation of the coolant through the external pipe 24.

1-2. CONFIGURATION OF POWER CONTROL UNIT

Figure 2:
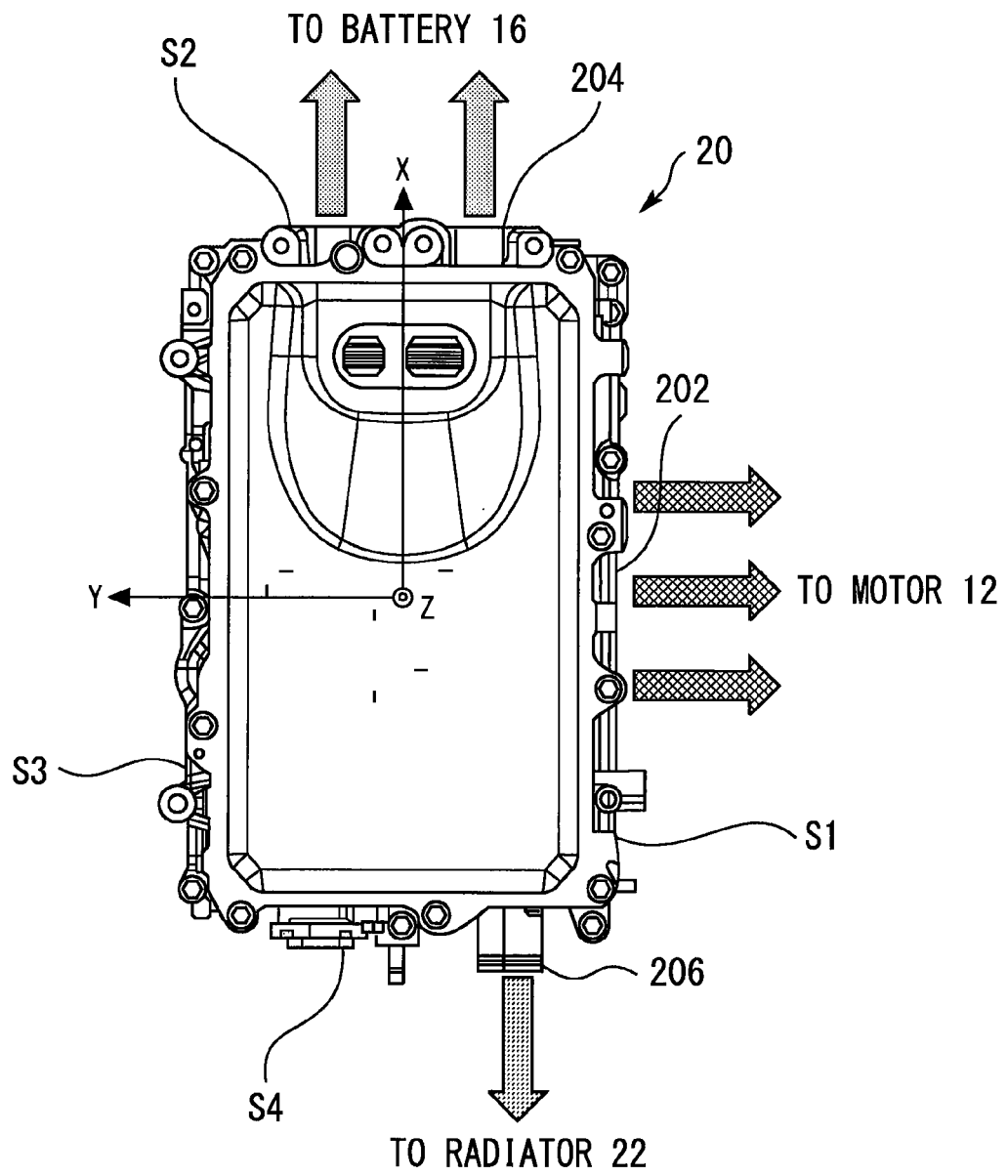
FIG. 2 is a plan view showing the appearance of a PCU.
Figure 3:
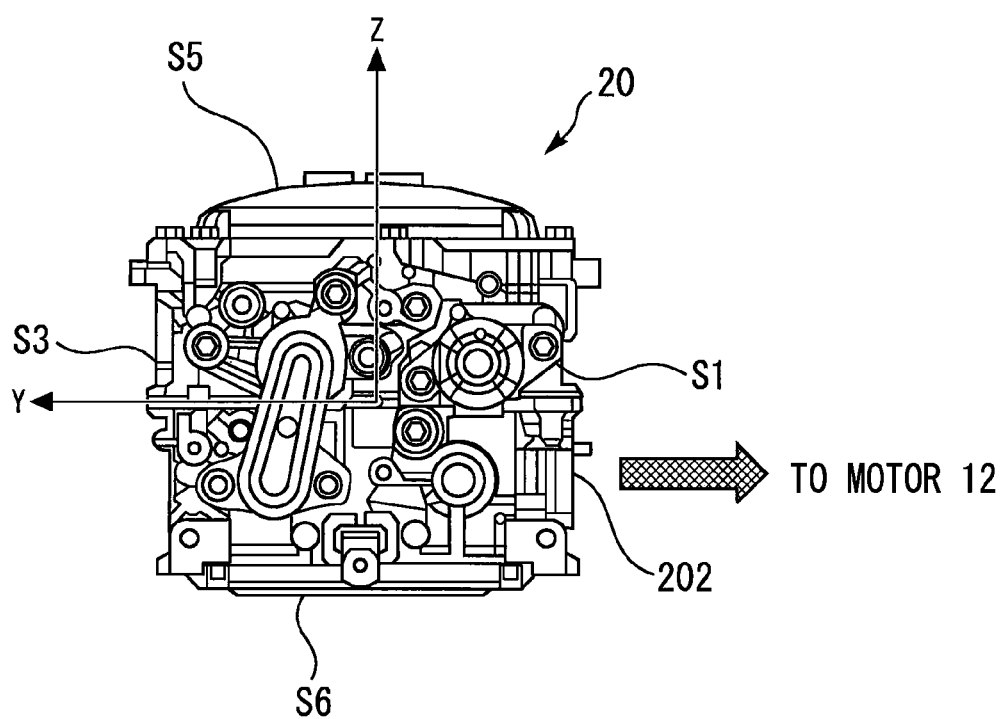
FIG. 3 is a front view showing the appearance of a PCU.
Figure 4:
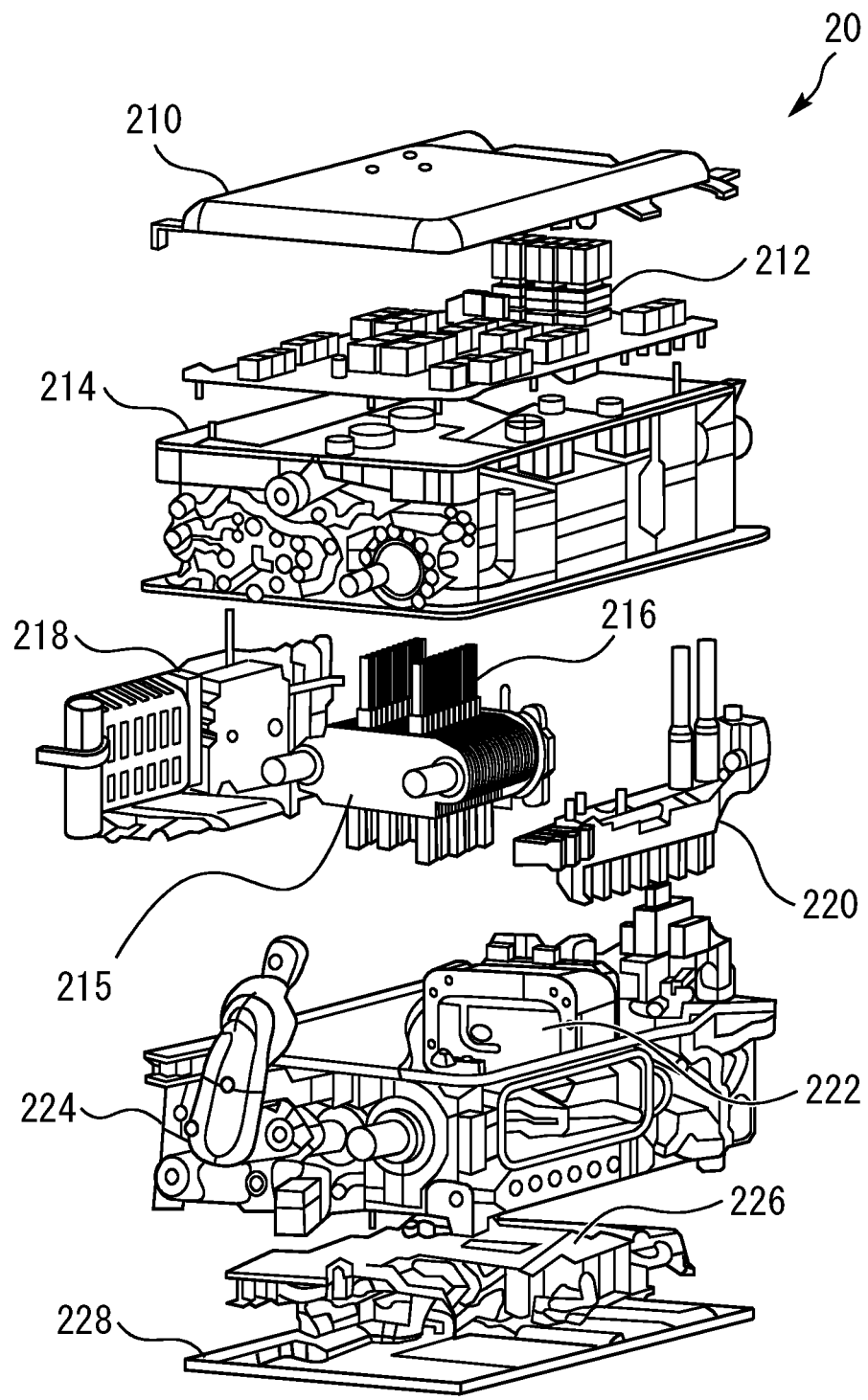
FIG. 4 is an internal block diagram schematically showing the internal structure of a PCU.

Next, the configuration of the PCU 20 will be described. FIG. 2 is a plan view showing the appearance of the PCU. FIG. 3 is a front view showing the appearance of the PCU. FIG. 4 is an internal configuration diagram schematically showing the internal structure of the PCU. As shown in FIGS. 2 and 3, the PCU 20 has a cuboid housing. In the following description, the right side surface (side surface perpendicular to the −Y direction) in the drawing is denoted as a first side surface S1, the front side surface (side surface perpendicular to the +X direction) is denoted as a second side surface S2, the left side surface (side surface perpendicular to the +Y direction) in the drawing is denoted as a third side surface S3, and the rear side surface (side surface perpendicular to the −X direction) is denoted as a fourth side surface S4. In addition, the top surface (side surface perpendicular to the +Z direction) in the drawing is denoted by a top surface S5, and the bottom surface (side surface perpendicular to the −Z direction) is denoted by a bottom surface S6. As shown in FIGS. 2 and 3, the first side surface S1 of the PCU 20 is perpendicular to the second side surface S2. The first side surface S1 of the PCU 20 faces the third side surface S3. Further, the second side surface S2 of the PCU 20 faces the fourth side surface S4.

As shown in FIGS. 2 and 3, the PCU 20 includes an MG terminal 202 for connecting the MG cable 14, a battery terminal 204 for connecting the battery cable 18, and a connection port 206 for connecting the external pipe 24. The MG terminal 202 is disposed on the first surface S1 of the PCU 20. The battery terminal 204 is disposed on the second side surface S2 of the PCU 20. The connection port 206 is disposed on the fourth side surface S4. The third side surface S3 of the PCU 20 is not provided with a terminal or a connection port for connection with another device.

Various electric components for controlling the electric power supplied to the in-wheel motor 12 are mounted inside the PCU 20. Specifically, as shown in FIG. 4, the PCU 20 includes an upper cover 210, a control circuit 212, an inverter case 214, a power stack 216 including a cooler 215 and a power card, a capacitor 218, a current sensor 220, a reactor 222, a converter case 224, a DC/DC converter 226, and a lower cover 228.

1-3. IN-VEHICLE STRUCTURE OF POWER CONTROL UNIT

Figure 5:
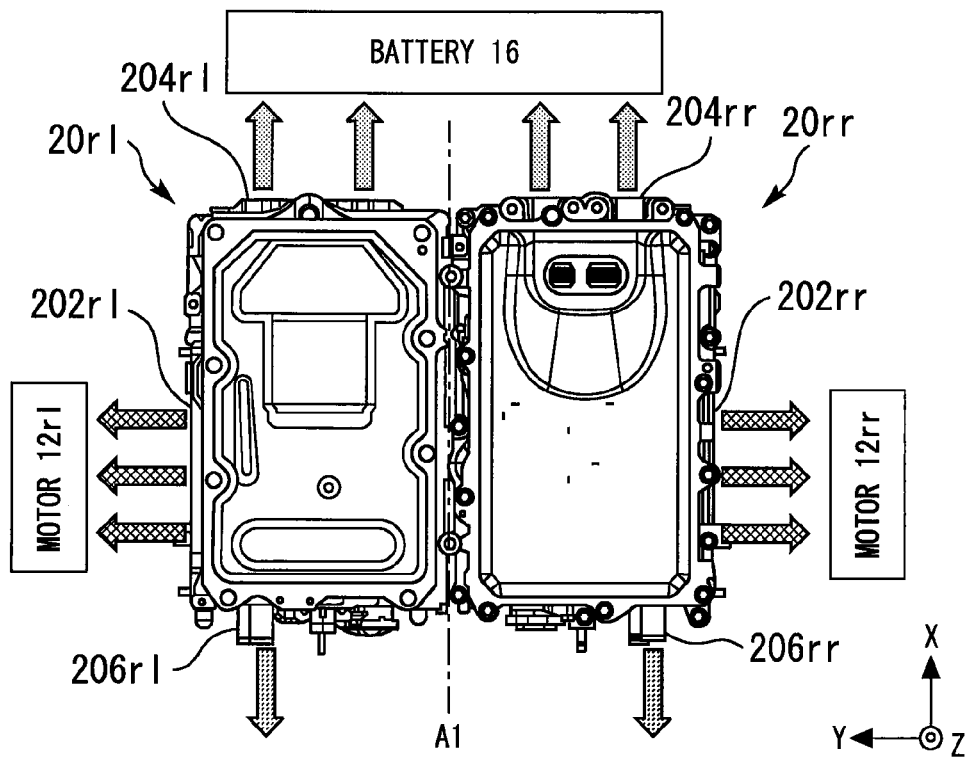
FIG. 5 is a plan view schematically showing the in-vehicle structure of a PCU.
Figure 6:
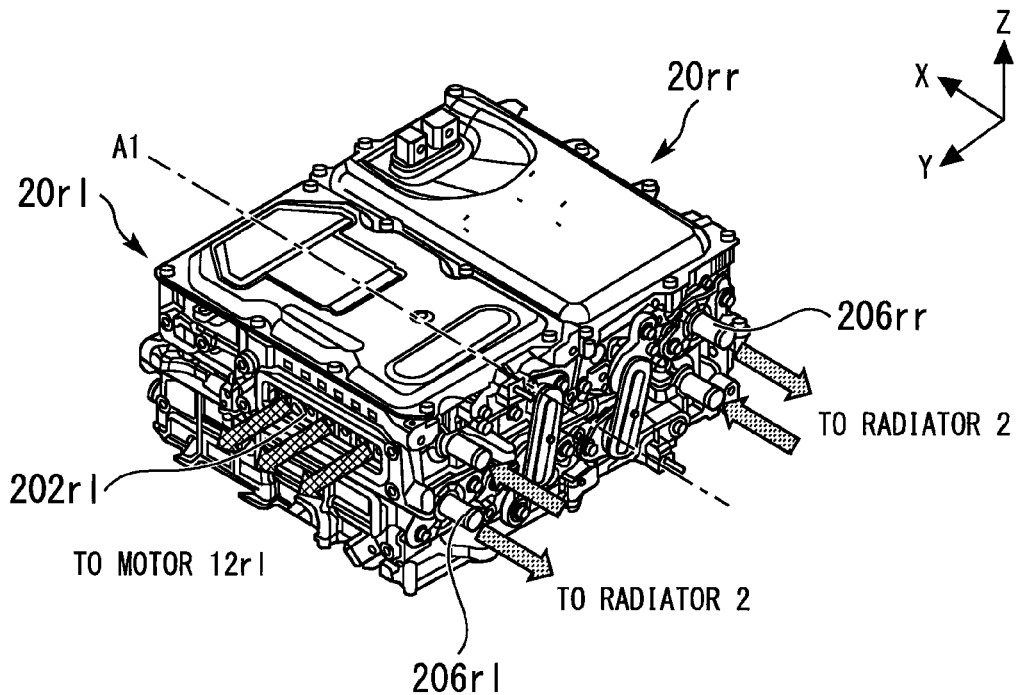
FIG. 6 is a perspective view of the in-vehicle structure of a PCU as seen from the rear side of the vehicle.
Figure 7:
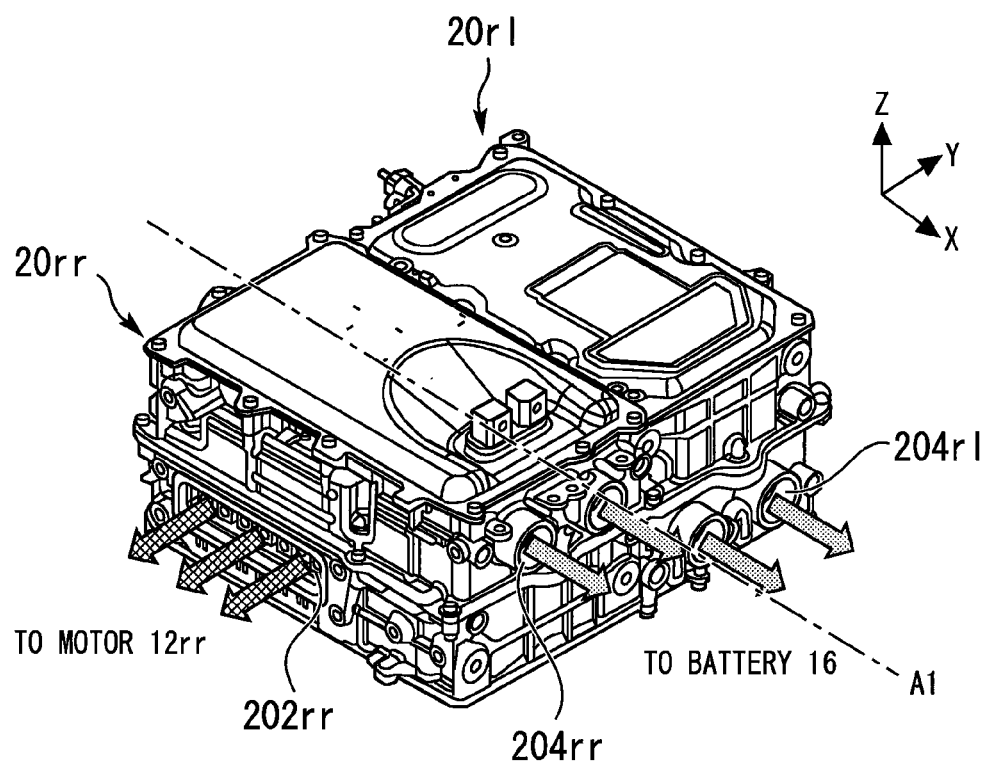
FIG. 7 is a perspective view of the in-vehicle structure of the PCU as viewed from the front side of the vehicle.

Next, a in-vehicle structure of the PCU 20, which is characteristic of the vehicle 100 of the first embodiment, will be described. FIG. 5 is a plan view schematically showing an in-vehicle structure of the PCU. FIG. 6 is a perspective view of the in-vehicle structure of the PCU as seen from the rear side of the vehicle. FIG. 7 is a perspective view of the in-vehicle structure of the PCU as viewed from the vehicle front side. As shown in these figures, the vehicle 100 according to the first embodiment includes a PCU 20rr for controlling the in-wheel motor 12rr and a PCU 20rl for controlling the in-wheel motor 12rl. In the pair of PCUs 20rr and 20rl, the PCU 20rl is rotated by 180 degrees about the axis in the X-direction so that both are axially symmetric with respect to the axis Al that is parallel to the X-axis. The pair of PCUs 20rr and 20rl are arranged such that the third side surfaces S3 are contacted with each other.

According to the PCU 20 of such an arrangement, the MG terminal 202rr of the PCU 20rr is direct toward the right side (i.e., −Y side) of the vehicle in which the in-wheel motor 12rr is arranged, and the MG terminal 202rl of the PCU 20rl is direct toward the left side (i.e., +Y side) of the vehicle in which the in-wheel motor 12rl is arranged. This makes it possible to prevent the MG cables 14rr and 14rl from becoming complicated to be routed.

Both the battery terminal 204rr of the PCU 20rr and the battery terminal 204rl of the PCU 20rl faces the front side (i.e., +X direction) of the vehicle in which the battery 16 is located. In this manner, since the battery terminals 204rr and 204rl are provided in the same direction, it is possible to prevent the connection of the battery cable 18 from becoming complicated.

Both the connection port 206rr of the PCU 20rr and the connection port 206rl of the PCU 20rl faces the rear side (i.e., −X direction) of the vehicle. This makes it possible to prevent the external pipe 24 from becoming complicated.

The PCU 20 has a third side surface S3 on which a terminal or a connection port for connection with another device is not provided. As a result, the PCUs 20rr and 20rl can be arranged in contact with each other, so that the arrangement can be made compact.

As described above, according to the vehicle 100 of the first embodiment, since it is possible to deal with the problem by using a pair of PCU 20 having the same configuration without requiring dedicated PCU corresponding to the control of the two in-wheel motors, it is possible to provide an in-wheel motor vehicle excellent in cost-reduction effects.

1-4. MODIFICATION EXAMPLES

The in-wheel motor vehicle 100 of the first embodiment may be modified as described below.

The pair of PCUs 20rr and 20rl may be disposed without contacting each other. That is, the pair of PCUs 20rr and 20rl may have a gap between the third side surfaces S3. This also applies to the vehicle 100 of a second embodiment, which will be described later.

The PCU 20 may be configured without the cooler. In this case, since the PCU 20 does not include the connection port 206, the layout of the connection port 206 does not need to be considered.

The positional relation between the battery 16 and the PCU 20 is not particularly limited. That is, the battery 16 may be disposed not on the side facing the second side surface S2 of the PCU 20, but on the side facing the fourth side surface S4 of the PCU 20, for example. This also applies to the vehicle 100 of the second embodiment, which will be described later.

Figure 8:
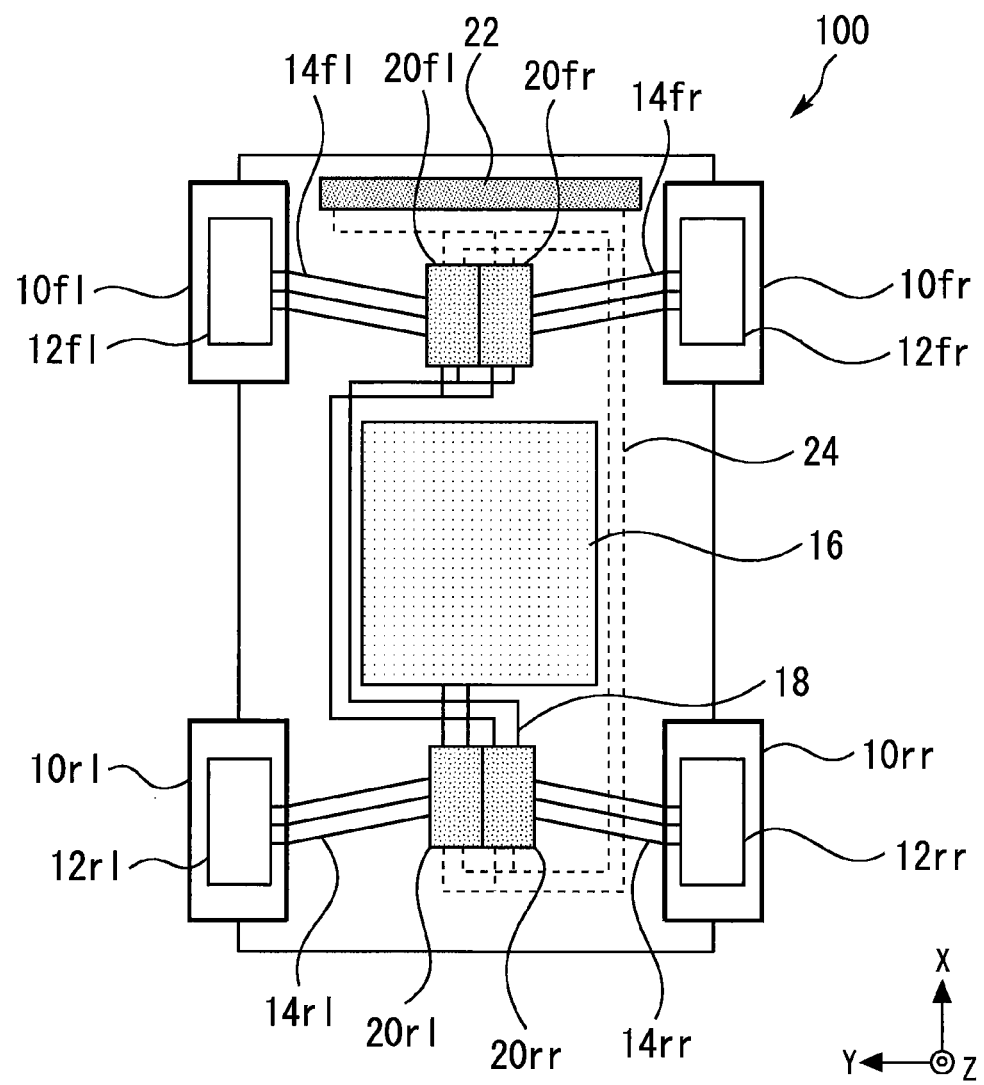
FIG. 8 is a diagram showing a configuration of a modification of the in-wheel motor vehicle according to Embodiment 1.

The in-wheel motor vehicle 100 may have a configuration in which not only the rear wheels but also all four wheels 10 are provided with in-wheel motors. FIG. 8 is a diagram showing a configuration of a modification of the in-wheel motor vehicle according to First Embodiment. In the modification shown in this figure, in addition to the configuration of the vehicle 100 shown in FIG. 1 described above, in-wheel motors 12*fr* and 12*fl* for independently driving the corresponding wheels are also disposed inside the wheels 10*fr* and 10*fl*. The in-wheel motors 12*fr* and 12*fl* are connected to the corresponding front wheel PCUs 20*fr* and 20*fl* via MG cables 14*fr* and 14*fl*, respectively. That is, the vehicle 10 of the modification shown in the drawing includes two pairs of in-wheel motors 12 and two pairs of PCU 20.

Figure 9:
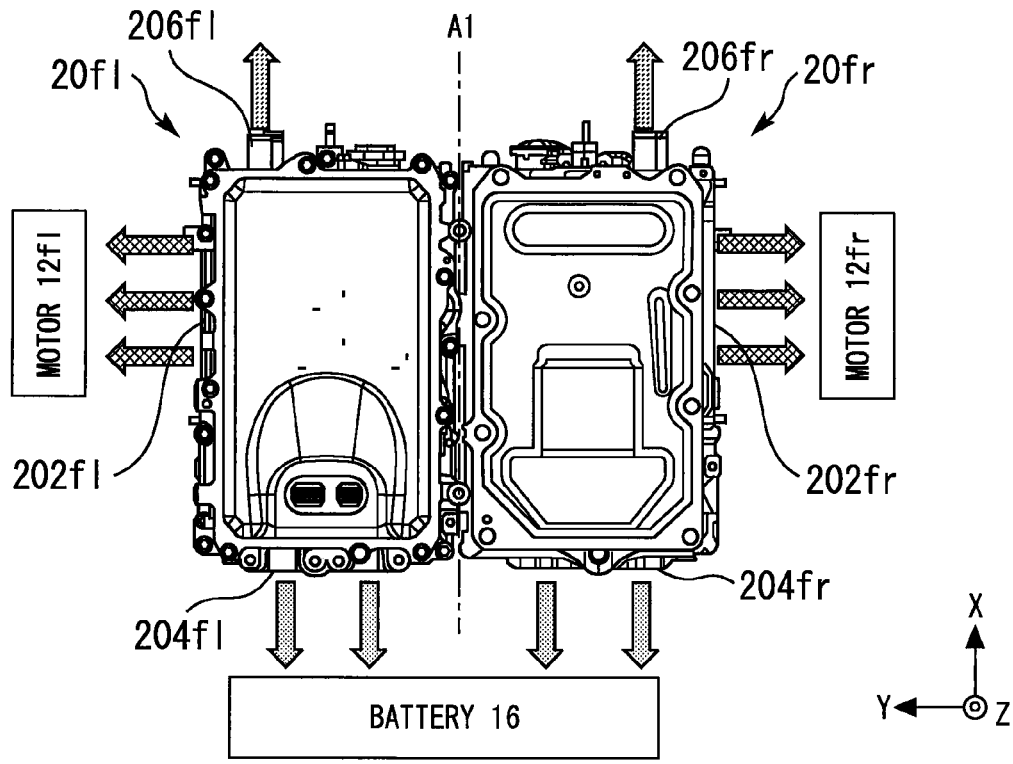
FIG. 9 is a plan view schematically showing an in-vehicle structure of a PCU for a front wheel.

FIG. 9 is a plan view schematically showing the in-vehicle structure of the PCU for the front wheel. As shown in this drawing, the layout of a pair of PCUs 20*fr* and 20*fl* for the front wheel is the same as the arrangement of the pair of PCUs 20*rr* and 20*rl* for the rear wheel shown in FIG. 1. Specifically, the MG terminal 202*fr* of the PCU 20*fr* faces the right side (i.e., −Y side) of the vehicle in which the in-wheel motor 12*fr* is disposed, and the MG terminal 202*fl* of the PCU 20*fl* faces the left side (i.e., +Y side) of the vehicle in which the in-wheel motor 12*fl* is disposed. Both the battery terminal 204*fr* of the PCU 20*fr* and the battery terminal 204*fl* of the PCU 20*fl* face the front of the vehicle in which the battery 16 is located. According to such an arrangement, even if the four PCU 20 having a common structure are used, complicated routing of the MG cable 14 and the battery cable 18 can be effectively prevented.

Second Embodiment

Next, features of the in-wheel motor vehicle of the second embodiment will be described.

2-1. FEATURES OF POWER CONTROL UNIT

Figure 10:
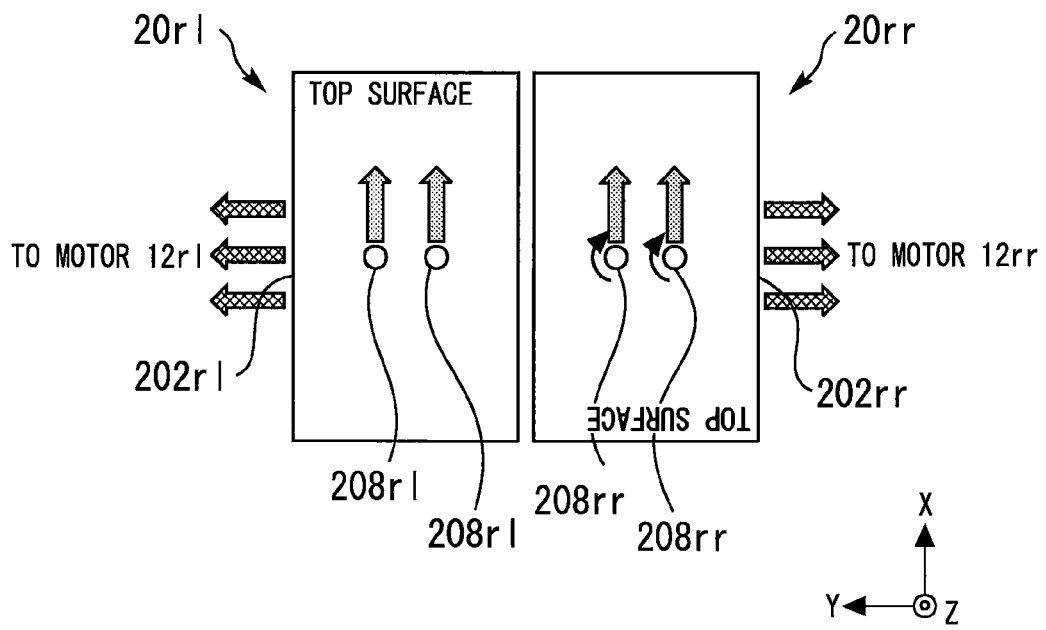
FIG. 10 is a plan view schematically showing an in-vehicle structure of a PCU according to the second embodiment.
Figure 11:
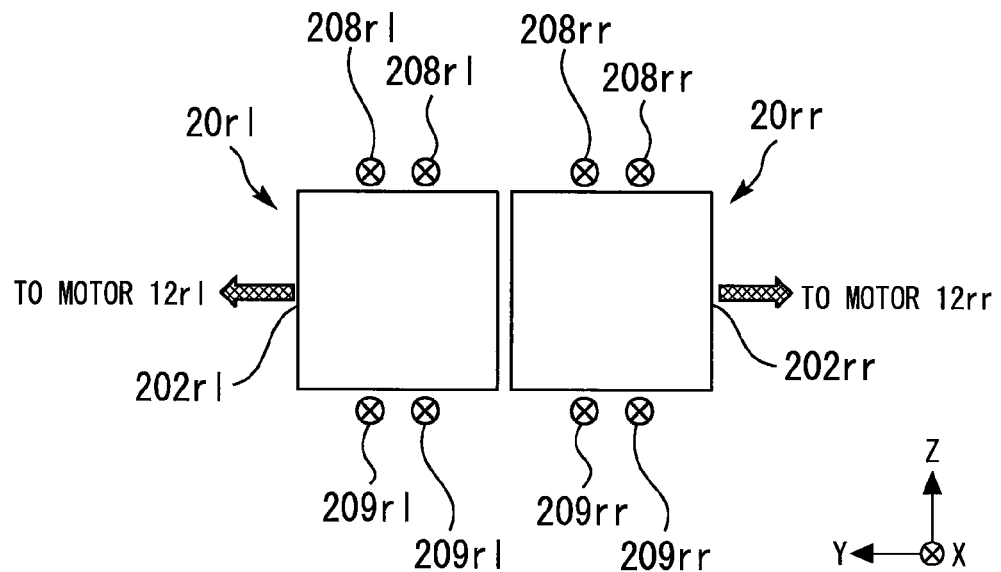
FIG. 11 is a front view schematically showing the in-vehicle structure of a PCU according to the second embodiment.
Figure 12:
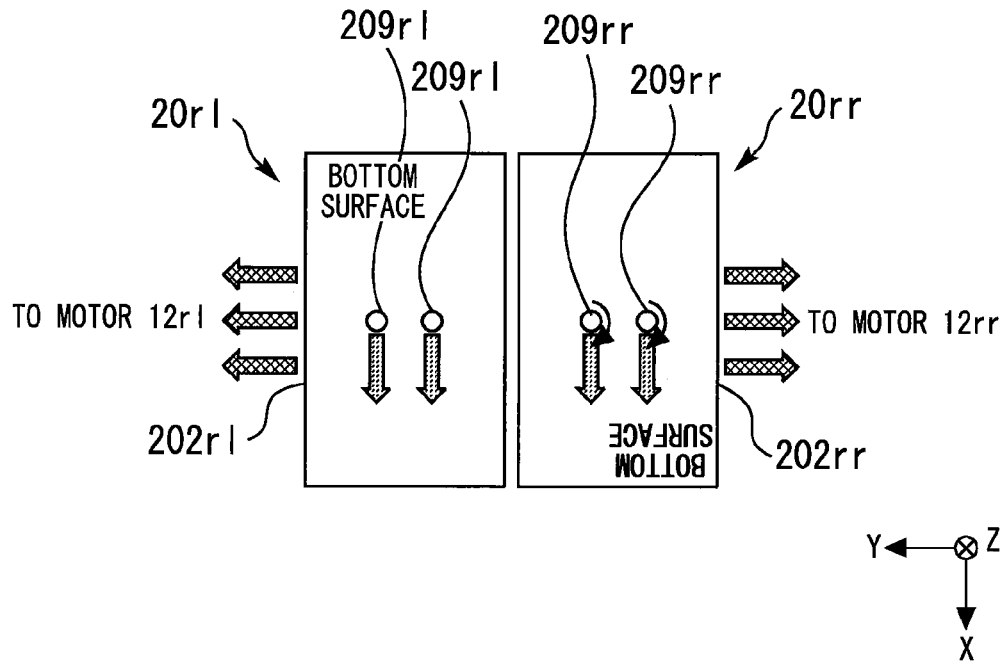
FIG. 12 is a bottom view schematically showing the in-vehicle structure of a PCU according to the second embodiment.

The in-wheel motor vehicle 100 according to the second embodiment is characterized by the layout and structure of the PCU 20 battery terminals. FIG. 10 is a plan view schematically showing an in-vehicle structure of the PCU according to the second embodiment. FIG. 11 is a front view schematically showing an in-vehicle structure of the PCU according to the second embodiment. FIG. 12 is a bottom view schematically showing the in-vehicle structure of the PCU according to the second embodiment. As shown in these drawings, battery terminals 208*rr* and 208*rl* of variable connecting directions are arranged on the upper surface S5 of the pair of PCUs 20*rr* and 20*rl*, respectively. The battery terminals 208*rr* and 208*rl* are configured so that the connection direction of the battery cable 18 can be adjusted in an arbitrary direction along the upper surface S5. The structure of the battery terminals 208*rr* and 208*rl* is not particularly limited. That is, the battery terminals 208*rr* and 208*rl* may be realized by using a known technique for flexibly rotating the orientation of the terminals.

In the pair of PCUs 20*rr* and 20*rl*, the PCU 20*rl* is rotated by 180 degrees about the Z-direction axis so that both are axially symmetric with respect to the Z-axis. The pair of PCUs 20*rr* and 20*rl* are arranged such that the third side surfaces S3 are contacted with each other.

Further, as shown in these drawings, connection ports 209*rr* and 209*rl* of variable connection directions are respectively arranged on the bottom surface S6 of the pair of PCUs 20*rr* and 20*rl*. The connection ports 209*rr* and 209*rl* are configured so that the connection direction with the external pipe 24 can be adjusted in an arbitrary direction along the bottom surface S6. The structure of the connection ports 209*rr* and 209*rl* is not particularly limited. That is, the connection ports 209*rr* and 209*rl* may be realized by using a known technique for flexibly rotating the direction of the connection ports.

According to the PCU 20 of such an arrangement, the MG terminal 202*rr* of the PCU 20*rr* faces the right side (i.e., −Y side) of the vehicle in which the in-wheel motor 12*rr* is arranged, and the MG terminal 202*rl* of the PCU 20*rl* faces the left side (i.e., +Y side) of the vehicle in which the in-wheel motor 12*rl* is arranged. This makes it possible to prevent the MG cables 14*rr* and 14*rl* from becoming complicated to be routed.

Both the battery terminals 208*rr* of the PCU 20*rr* and the battery terminals 208*rl* of the PCU 20*rl* direct the connection direction with the battery cables 18 toward the front of the vehicle in which the battery 16 is disposed (+X direction). This makes it possible to prevent the battery cable 18 from becoming complicated to be routed.

Both the connection port 209*rr* of the PCU 20*rr* and the connection port 209*rl* of the PCU 20*rl* direct the connection direction with the external pipe 24 toward the front of the vehicle in which the radiator 22 is disposed (+X direction). This makes it possible to prevent the external piping 24 from becoming complicated.

2-2. MODIFICATION EXAMPLES

The in-wheel motor vehicle 100 of the second embodiment may be modified as described below.

The PCU 20 may be configured without a cooler. In this instance, the PCU 20 need not consider the construction and arrangement of the ports 209*rr*, 209*rl*.

The in-wheel motor vehicle 100 may be configured to have an in-wheel motor on all four wheels 10. In this instance, similarly to the configuration of the vehicle 100 of the first embodiment, the pair of PCUs 20*fr* and 20*fl* having the same configuration as the pair of PCUs 20*a* and 20*rl* of the second embodiment may be provided.

The pair of PCUs 20*a* and 20*rl* is not limited to the embodiment in which the battery terminals 208*rr*, 208*rl* are directed upward (+Z direction), may be placed so that the battery terminals 208*rr*, 208*rl* are directed downward (−Z direction).

What is claimed is:

1. An in-wheel motor vehicle comprising:
a pair of in-wheel motors corresponding to each of a pair of wheels;
a battery for storing electric power for driving the pair of in-wheel motors; and
a pair of power control units configured to control each of the pair of in-wheel motors, the pair of power control units including two power control units having surfaces that contact each other,
wherein each power control unit comprises:
a cuboid housing,
an MG terminal provided on a first side surface of the cuboid housing, for connecting an MG cable which is connected to an in-wheel motor, among the pair of in-wheel motors, and
a battery terminal provided on a second side surface orthogonal to the first side surface, for connecting a battery cable which is connected to the battery, and
wherein each of the pair of power control units is arranged such that the MG terminal of each power control unit faces a vehicle width direction in which a connected in-wheel motor is located and both of the battery terminals face a same direction that is in a vehicle front-rear direction.

2. The in-wheel motor vehicle according to claim 1, wherein the surfaces in contact with each other are side surfaces of the cuboid housings that are opposite the first side surface.

3. The in-wheel motor vehicle according to claim 1, wherein each power control unit comprises:
   a cooler provided inside the cuboid housing, and
   a connection port provided on a side surface opposite to the second side surface, for connecting between the cooler and an external pipe.

4. The in-wheel motor vehicle according to claim 1, wherein the battery terminals of both power control units face towards the battery.

5. The in-wheel motor vehicle of claim 1, wherein the vehicle comprises
   two sets of the pair of in-wheel motors, and
   two sets of the pair of power control units.

* * * * *